(12) United States Patent
Perfetto et al.

(10) Patent No.: US 10,480,447 B2
(45) Date of Patent: Nov. 19, 2019

(54) SYSTEM AND METHOD FOR CONTROL OF VOLUMETRIC EFFICIENCY IN A DIRECT INJECTION ENGINE

(71) Applicant: Cummins Inc., Columbus, IN (US)

(72) Inventors: Anthony Kyle Perfetto, Columbus, IN (US); Samuel C. Geckler, Columbus, IN (US); David Stroh, Columbus, IN (US); Carlos A. Lana, Columbus, IN (US)

(73) Assignee: Cummins Inc., Columbus, IN (US)

( * ) Notice: Subject to any disclaimer, the term of this patent is extended or adjusted under 35 U.S.C. 154(b) by 119 days.

(21) Appl. No.: 15/321,697

(22) PCT Filed: Jun. 26, 2014

(86) PCT No.: PCT/US2014/044400
§ 371 (c)(1),
(2) Date: Dec. 22, 2016

(87) PCT Pub. No.: WO2015/199701
PCT Pub. Date: Dec. 30, 2015

(65) Prior Publication Data
US 2017/0159599 A1    Jun. 8, 2017

(51) Int. Cl.
*F02D 41/40* (2006.01)
*F02D 41/00* (2006.01)
(Continued)

(52) U.S. Cl.
CPC ........... *F02D 41/401* (2013.01); *F02D 21/08* (2013.01); *F02D 41/005* (2013.01);
(Continued)

(58) Field of Classification Search
CPC ........ F02M 26/43; F02M 26/05; F02M 26/47; F02M 26/04; F02D 41/0085;
(Continued)

(56) References Cited

U.S. PATENT DOCUMENTS

2001/0032617 A1* 10/2001 Kawakami .......... F02D 13/0219
123/406.64
2003/0172914 A1* 9/2003 Stroh .................. F02D 41/0042
123/674

(Continued)

FOREIGN PATENT DOCUMENTS

EP    1 639 255    3/2012

OTHER PUBLICATIONS

International Search Report dated Nov. 3, 2014 in PCT/US2014/044400 which was previously submitted.

*Primary Examiner* — Sizo B Vilakazi
(74) *Attorney, Agent, or Firm* — Faegre Baker Daniels LLP (57) ABSTRACT

A system and method of inducing an operational response change in an operating direct-injection internal combustion engine is provided such that the engine includes a cylinder into which liquid fuel injection is directly performed. The method starts by operating the direct-injection engine using a start of injection (SOI) protocol. At some point during operation, it is determined that a change is desired for a first parameter of engine operation that is at least partially a function of a charge provided to the cylinder (such as the torque output). In response an operational response in the engine is induced by altering the SOI protocol via a first SOI alteration that alters the volumetric efficiency of the cylinder and changes the first parameter.

14 Claims, 4 Drawing Sheets

(51) Int. Cl.
   *F02D 41/14* (2006.01)
   *F02D 21/08* (2006.01)
   *F02M 26/43* (2016.01)
   *F02M 26/04* (2016.01)
   *F02D 41/38* (2006.01)

(52) U.S. Cl.
   CPC ..... *F02D 41/0007* (2013.01); *F02D 41/0085* (2013.01); *F02D 41/1448* (2013.01); *F02D 41/1497* (2013.01); *F02M 26/04* (2016.02); *F02M 26/43* (2016.02); *F02D 2041/389* (2013.01); *F02D 2200/0406* (2013.01); *F02D 2200/0411* (2013.01)

(58) Field of Classification Search
   CPC ............. F02D 41/1448; F02D 41/1497; F02D 41/401; F02D 21/08; F02D 41/0007; F02D 41/005; F02D 2041/389; F02D 2200/0406; F02D 2200/0411; Y02T 10/44; Y02T 10/144
   See application file for complete search history.

(56) References Cited

U.S. PATENT DOCUMENTS

| | | | |
|---|---|---|---|
| 2011/0174268 A1* | 7/2011 | Surnilla | F02D 35/027 123/406.29 |
| 2012/0042850 A1* | 2/2012 | Haskara | F02D 41/0072 123/305 |
| 2014/0069377 A1* | 3/2014 | Brennan | F02D 41/0002 123/350 |

* cited by examiner

SYSTEM AND METHOD FOR CONTROL OF VOLUMETRIC EFFICIENCY IN A DIRECT INJECTION ENGINE

FIELD OF THE DISCLOSURE

The present invention relates generally to systems for controlling volumetric efficiency in internal combustion engines, and more specifically to systems for controlling volumetric efficiency by altering the start of injection timing.

BACKGROUND

Engines operate by providing heat, oxygen, and fuel in the proper combination (air/fuel ratio) to produce contained combustion within the engine. If exactly enough air is provided to completely burn all of the fuel, the ratio is known as a stoichiometric mixture, often abbreviated to stoich. Deviating from stoich has ramifications on the emissions, efficiency, and performance produced thereby. In direct injection engines, electrically controlled injectors deliver fuel directly into the cylinders. While all the injectors may be supplied fuel by a common high pressure rail, such injectors provide the ability to precisely control both the amount and the time instant the fuel is delivered on a cylinder-by-cylinder basis. Air (charge) provided to a cylinder is at least partially a function of the position and movement of an intake valve of the engine. Charge provided to a cylinder is further a function of valve settings. In an effort to get more oxygen molecules in a cylinder, turbochargers are used. Turbocharging machinery is well-known and commonly used in the internal combustion engine industry to pressurize intake air entering the engine combustion chambers and thereby increase the efficiency and power output of the engine.

Whereas the electronic fuel injectors allow precise metering that is readily adjustable during operation and can be adjusted on a cylinder-by-cylinder basis at a speed that is appropriate for the number of injection events per second, providing charge flow is largely a mechanical process that is not as conducive to quick changes or to cylinder-by-cylinder customization.

Accordingly, changes to operation of a cylinder are commonly effected by altering the fueling profile thereof. Any changes made to the charge flow are able to be implemented much slower than fueling changes. If a cylinder is experiencing a different charge flow than other cylinders, the system either risks deviating from stoich, or (if the system compensates by altering the fueling command for the deviant cylinder) risks having a power output imbalance between the cylinders (if no further compensation is applied).

What is therefore needed is a system for allowing effective change in charge flow having a speed of change closer to that achievable with fueling and having the ability to be customized cylinder-by-cylinder.

DETAILED DESCRIPTION

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Briefly, in one example, a method of inducing an operational response change in an operating direct-injection internal combustion engine is provided such that the engine includes a cylinder into which liquid fuel injection is directly performed. The method starts by operating the direct-injection engine using a start of injection (SOI) protocol. At some point during operation, it is determined that a change is desired for a first parameter of engine operation that is at least partially a function of a charge provided to the cylinder (such as the torque output). In response an operational response in the engine is induced by altering the SOI protocol via a first SOI alteration that alters the volumetric efficiency of the cylinder and changes the first parameter.

In another example a method of operating an internal combustion engine is provided, the engine having an intake manifold fluidly coupled to multiple cylinders including at least a first and second cylinder, the method comprising: determining the existence of an imbalance between the first and second cylinders with respect to a first engine property; and altering a volumetric efficiency experienced by the first cylinder independently of the volumetric efficiency experienced by the second cylinder to reduce the imbalance between the first and second cylinders.

In yet another example, an injection control system of an internal combustion engine including an injection valve operable to inject fluid directly into a first cylinder and perform one or more injections on an intake or compression stroke is provided. The system comprising an engine controller operable to determine that a change of a first parameter of engine operation is desired where such first parameter is at least partially a function of a charge provided to the first cylinder; the controller further operable to generate an operational response in the engine, responsive to the determination of the desired change, by altering a SOI protocol via a first SOI alteration that alters the volumetric efficiency of the first cylinder and changes the first parameter.

In another example, an injection control system of an internal combustion engine including an injection valve operable to inject fluid directly into a cylinder and perform one or more injections on an intake stroke is provided. The system comprising: a first cylinder; a second cylinder; a manifold fluidly coupled to the first and second cylinders; and an engine controller operable to determine that an imbalance exists between the first and second cylinders; the controller further operable to generate an operational response in the engine, responsive to the determination of the imbalance, by altering a volumetric efficiency of the first cylinder to reduce the imbalance between the first and second cylinders.

Figure 1:
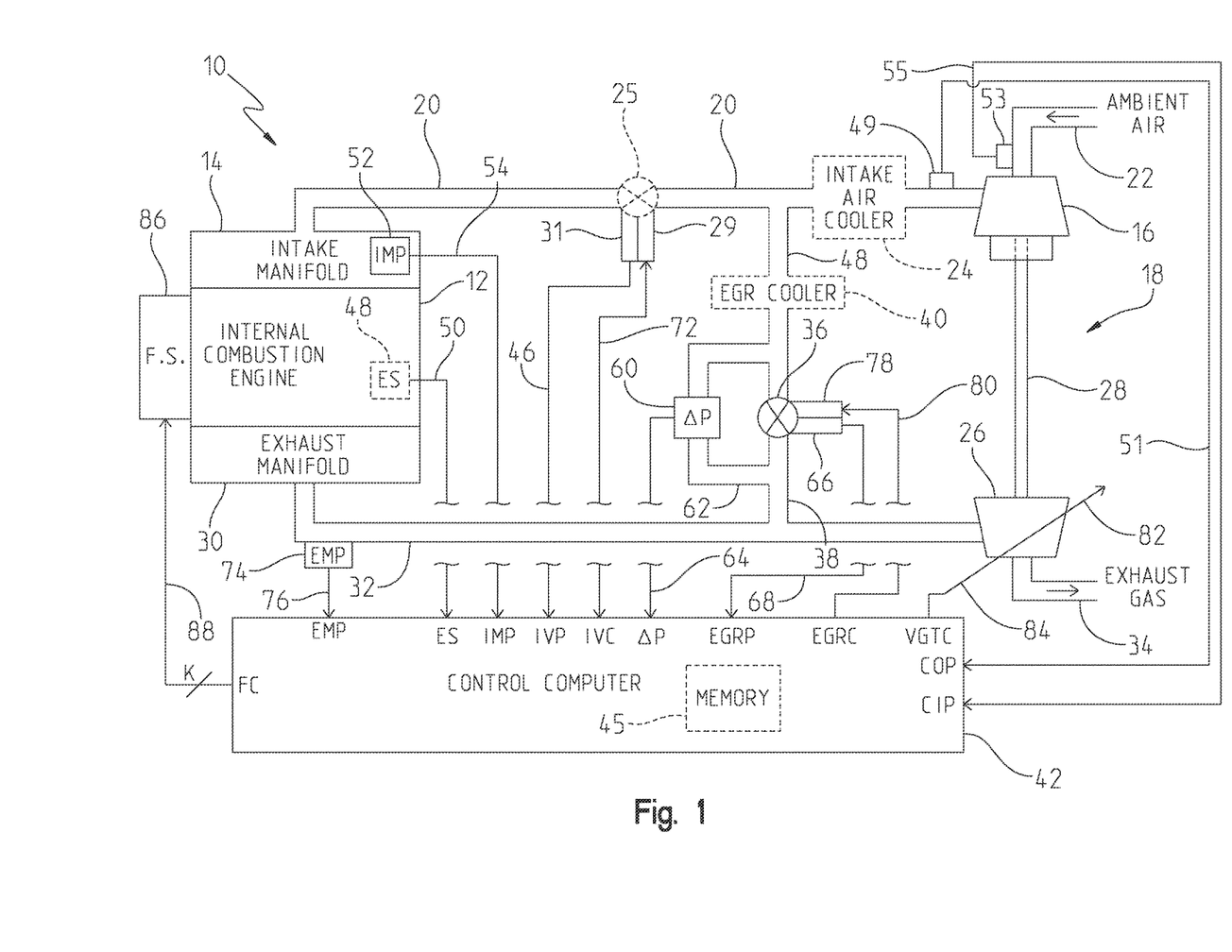
FIG. 1 is a diagram of one illustrative embodiment of a system for controlling volumetric efficiency in an internal combustion engine.

Referring now to FIG. 1, a diagram of one illustrative embodiment of a system 10 for controlling charge flow in a turbocharged internal combustion engine is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh ambient air therefrom. Optionally, as shown in phantom in FIG. 1, system 10 may include an intake air cooler 24 of known construction disposed in-line with intake conduit 20 between the turbocharger compressor 16 and the intake manifold 14. System 10 further includes an intake charge (throttle) valve 25 disposed in-line with intake conduit 20 between the turbocharger compressor 16 and the intake manifold 14. The turbocharger compressor 16 is mechanically and rotatably coupled to a variable geometry turbocharger turbine 26 via a drive shaft 28, wherein turbine 26 includes a turbine inlet fluidly coupled to an exhaust manifold 30 of engine 12 via an exhaust conduit 32, and further includes a turbine outlet fluidly coupled to ambient via an exhaust conduit 34. An EGR valve 36 is disposed in-line with an EGR conduit 38 fluidly coupled at one end to the intake conduit 20 and an opposite end to the exhaust conduit 32, and an EGR cooler 40 of known construction may optionally be disposed in-line with EGR conduit 38 between EGR valve 36 and intake conduit 20 as shown in phantom in FIG. 1. In one embodiment, EGR conduit 38 is coupled to exhaust of less than all cylinders of engine 12. The cylinders coupled to EGR conduit 38 in such a setup are referred to as dedicated EGR cylinders. In that their exhaust is dedicated to feeding the EGR conduit 38. In such an embodiment, exhaust of non-dedicated cylinders is routed to turbocharger turbine 26.

System 10 includes a control computer 42 that is generally operable to control and manage the overall operation of engine 12. Control computer 42 includes a memory unit 45 as well as a number of inputs and outputs for interfacing with various sensors and systems coupled to engine 12. Control computer 42 is, in one embodiment, microprocessor-based and may be a known control unit sometimes referred to as an electronic or engine control module (ECM), electronic or engine control unit (ECU) or the like, or may alternatively be a general purpose control circuit capable of operation as will be described hereinafter. In any case, control computer 42 includes one or more control algorithms, as will be described in greater detail hereinafter, for controlling fueling and charge flow in engine 12.

Control computer 42 includes a number of inputs for receiving signals from various sensors or sensing systems associated with system 10. For example, system 10 includes an engine speed sensor 48 electrically connected to an engine speed input, ES, of control computer 42 via signal path 50. Engine speed sensor 48 is operable to sense rotational speed of the engine 12 and produce a corresponding engine speed signal on signal path 50 indicative of engine rotational speed. In one embodiment, sensor 48 is a Hall effect sensor operable to determine engine speed by sensing passage thereby of a number of equi-angularly spaced teeth formed on a gear or tone wheel. Alternatively, engine speed sensor 48 may be any other known sensor operable as just described including, but not limited to, a variable reluctance sensor or the like.

Figure 2:
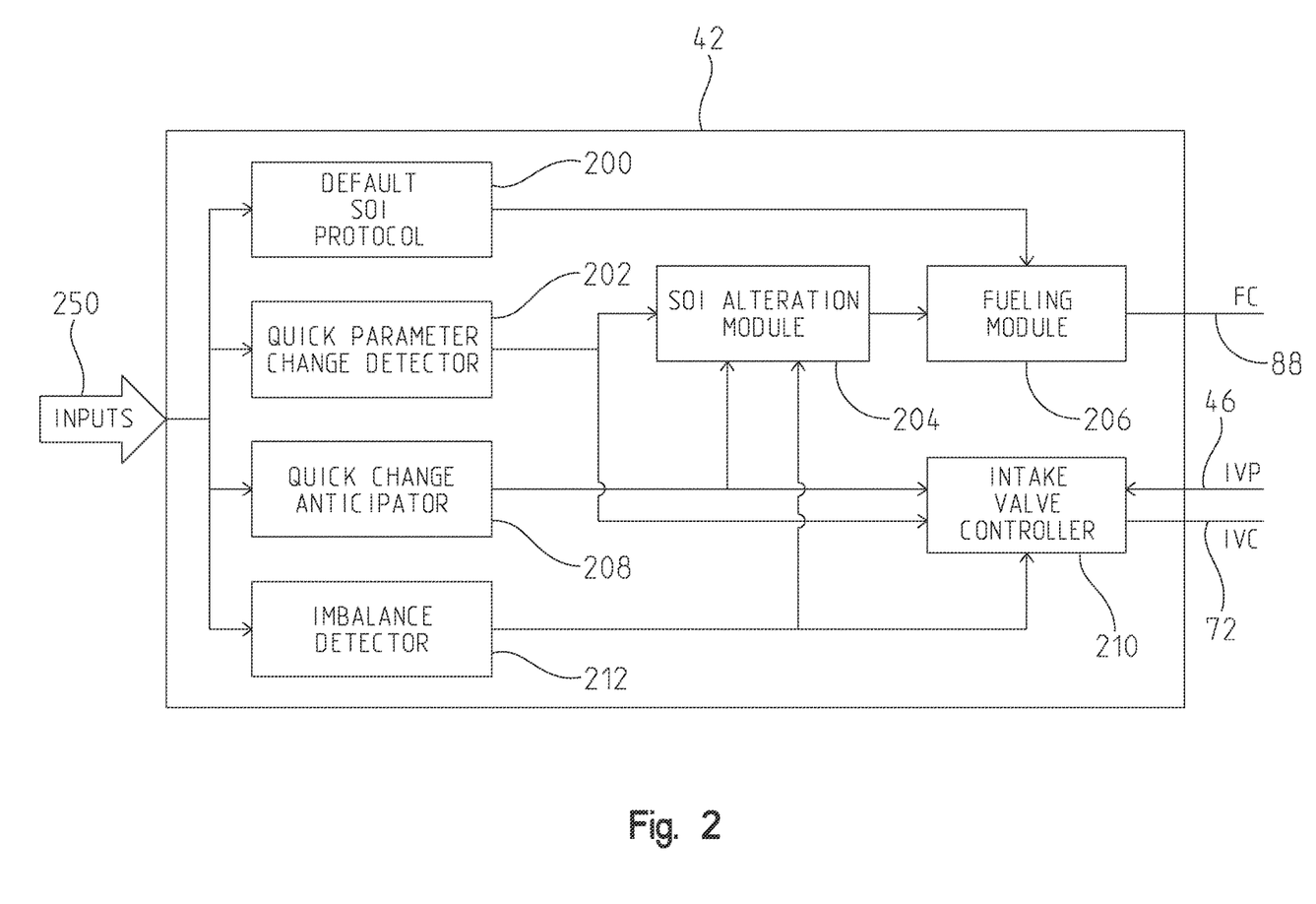
FIG. 2 is a block diagram of one illustrative configuration of some of the internal features of the control computer of FIG. 1 as they relate to controlling volumetric efficiency in an internal combustion engine.

System 10 further includes additional sensors such as a compressor inlet pressure sensor 53 (electrically connected to a compressor inlet pressure input, CIP, of control computer 42 via signal path 55), a compressor outlet pressure sensor 49 (electrically connected to a compressor outlet pressure input, COP, of control computer 42 via signal path 51), an intake manifold pressure sensor 52 (electrically connected to an intake manifold pressure input, IMP, of control computer 42 via signal path 54), a differential pressure sensor, or ΔP sensor, 60 (electrically connected to a ΔP input of control computer 42 via signal path 64), and an engine exhaust pressure sensor 74 (electrically connected to an engine exhaust pressure input, EMP, of control computer 42 via signal path 76). Each of these sensors generate signals that are examples of inputs to control computer 42, illustrated generally as inputs 250, FIG. 2

Control computer 42 also includes a number of outputs for controlling one or more engine functions associated with system 10. For example, EGR valve 36 includes an EGR valve actuator 78 electrically connected to an EGR valve control output, EGRC, of control computer 42 via signal path 80. Control computer 42 is operable to produce an EGR valve control signal on signal path 80, and actuator 78 is responsive to the EGR valve control signal to control the position of EGR valve 36 relative to a reference position in a known manner. Control computer 42 is accordingly operable to control EGR valve 36 in a known manner to selectively provide a flow of recirculated exhaust gas from exhaust manifold 30 to intake manifold 14. EGR valve 36 further includes an EGR position sensor 66 electrically connected to an EGR valve position input, EGRP, of control computer 42 via signal path 68. Sensor 66 may be of known construction and is operable to determine a position of EGR valve 36 by determining a position of EGR valve actuator 78 relative to a reference actuator position, and producing a position signal on signal path 68 indicative of the position of EGR valve 36 relative to a reference position. Intake charge valve 25 includes an intake valve actuator 27, electrically connected to an intake valve control output, IVC, of control computer 42 via signal path 72. Control computer 42 is operable to produce an intake valve control signal on signal path 72, and actuator 29 is responsive to the intake valve control signal to control the position of intake valve 25 relative to a reference position in a known manner. Control computer 42 is accordingly operable to control intake valve 25, when present, in a known manner to adjust a flow gas into intake manifold 14. Intake valve 25 further includes an intake valve position sensor 31 electrically connected to an intake valve position input, IVP, of control computer 42 via signal path 46. Sensor 31 may be of known construction and is operable to determine a position of intake valve 25 by determining a position of intake valve actuator 29 relative to a reference actuator position, and producing a position signal on signal path 46 indicative of the position of intake valve 25 relative to a reference position.

System 10 further includes a variable geometry turbocharger (VGT) mechanism, shown generally as 82, and electrically connected to a VGT control output, VGTC, of control computer 42 via signal path 84. The VGT mechanism 82 may be embodied as any combination of a mechanical or electromechanical mechanism controllable in a known manner to modify the effective geometry of the turbocharger turbine 26, a wastegate disposed between conduits 32 and 34 and controllable in a known manner to selectively route exhaust gas around the turbine 26, and an exhaust throttle disposed in-line with either of conduits 32 and 34 and controllable in a known manner to selectively restrict exhaust gas flow through conduits 32 and 34 and turbine 26. Control computer 42 is accordingly operable to control any one or more of these VGT mechanisms in a known manner to selectively control the swallowing capacity and/or efficiency of the turbocharger 18.

Volumetric efficiency is a term that refers to the efficiency with which the engine can move the charge into and out of the cylinders. More specifically, volumetric efficiency is a ratio (or percentage) of the quantity of air that is trapped by the cylinder during induction over the swept volume of the cylinder under static conditions. Volumetric Efficiency can be improved in a number of ways, most effectively this can be achieved by increasing valve overlap (the time at which an input and output valve are simultaneously open). Large valve overlap can cause volumetric efficiency to exceed 100%.

System 10 further includes a fuel system 86 electrically connected to a fuel command output, FC, of control computer 42 via a number, K, of signal paths 88 wherein K may be any positive integer. K is illustratively equal to the number of cylinders in engine 12. Each signal path 88 is illustratively coupled to and responsible for operation of a fuel injector for a cylinder. Fuel system 86 is responsive to fueling commands, FC, produced by fueling module 206 of control computer 42 to supply fuel to engine 12 in a known manner.

In addition to varying the amount of fuel injected, fuel system 86 (as commanded by control computer 42) can vary the timing of the injection. The timing of the injection is measured by the start of injection (SOI) and is expressed as the location of the crankshaft (degrees) for a particular piston relative to top-dead-center (TDC) for that piston. Accordingly, SOI for a particular piston would be X degrees before TDC, see FIG. 5. It should be readily appreciated that other manners of defining SOI can be implemented within the spirit of the teachings herein. It should also be appreciated that rather than a single injection event, multiple pulses of fuel can be provided. Discussion herein of varying the SOI should be understood to be inclusive of varying multiple pulses of a cycle and varying proportions of fuel at each pulse.

Figure 5:
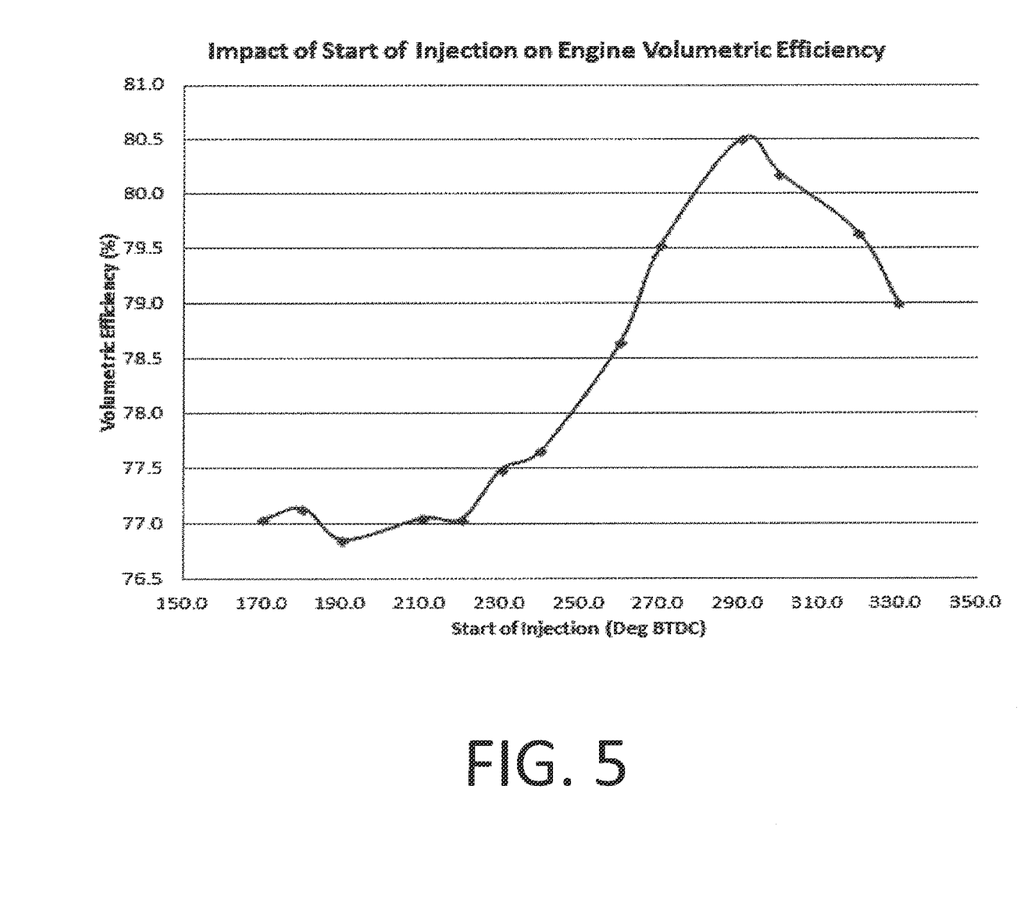
FIG. 5 is an exemplary graph showing change in volumetric efficiency as a function of the degrees before top dead center at which start of injection (SOI) is implemented.

Among other things, the start of injection directly affects the temperature of the air mass in the cylinder, which changes the volumetric efficiency. One test revealed a 7% change in volumetric efficiency achievable by varying the SOI. FIG. 5 is a graph showing a change in volumetric efficiency as a function of SOI for one exemplary set of engine conditions. Accordingly, by varying the SOI, an electronic "control" for volumetric efficiency is provided via the electronic control of the fuel injector. Furthermore, the change in volumetric efficiency is able to be quickly implemented in that the electronic control can be quickly supplied and has its effect directly at the cylinder. This change is thus faster relative to other ways of varying volumetric efficiency, such as those dependent upon the engagement of or changes at turbocharger 18 or intake throttle 25. It should be appreciated that changing the SOI also changes other parameters on engine 12. Still further, while elements such as turbocharger 18 and intake throttle 25 are able to impact volumetric efficiency and the charge flow, these elements act on the charge as a whole that is shared by all of the cylinders (or at least all cylinders on a common manifold). SOI can be varied cylinder-by-cylinder such that volumetric efficiency can be varied cylinder-by-cylinder, even for cylinders that share a common intake manifold and or charge source.

Having described engine 12 and the alteration of volumetric efficiency by altering the SOI, multiple exemplary uses for this cylinder-level change in volumetric efficiency are now discussed.

Figure 3:
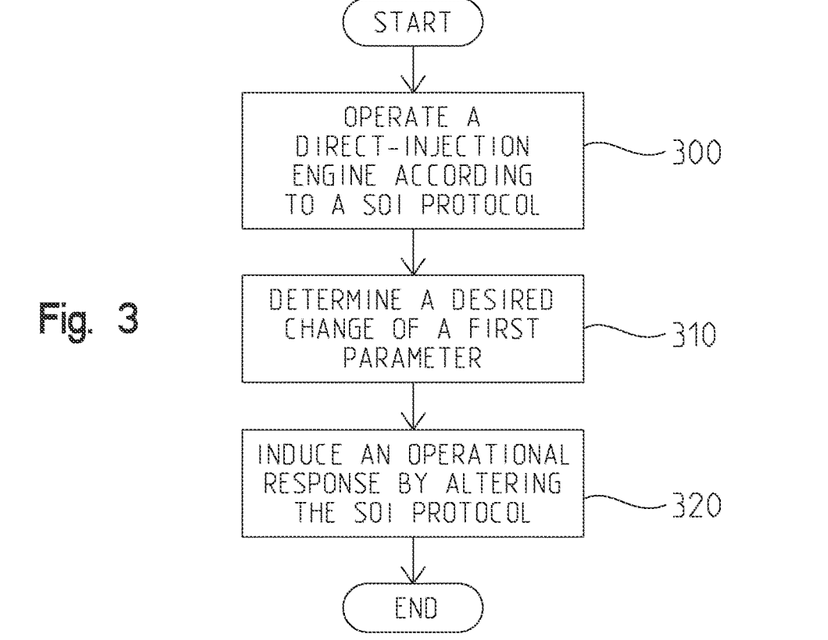
FIG. 3 is a block diagram of one illustrative embodiment of operation of the engine of FIGS. 1 and 2 that initiates a fast change response time for charge flow.

Referring now to FIG. 3, a first set of exemplary uses is described. The first set of exemplary uses share the common feature that they allow for "faster" changes in conditions that are impacted by volumetric efficiency. As previously noted, there are other ways of impacting volumetric efficiency. Accordingly, a first set of fuel injections and engine cycles need to occur to start a desired change in the turbocharger, and then through multiple such cycles the turbocharger is "ramped up" to provide the change in volumetric efficiency (turbo lag). A change in the SOI allows an almost instantaneous increase in the charge being passed through the cylinders and thus to the turbine. Accordingly, turbo lag is reduced. Computer 42 has a default SOI protocol 200 that it operates under in normal (steady state) conditions, block 300, FIG. 3. A call for more turbocharging (quick parameter change detector 202, FIG. 2) is met with a command to alter the SOI (a SOI deviation from the steady state instructions, SOI alteration module 204). Accordingly, a determination is made that there is a desired change of a first parameter (such as increased intake manifold pressure), block 310. In response to this determination, an operational response is induced by altering the SOI protocol, block 320.

In one embodiment, as turbine sees more airflow, turbine either reaches its desired power output, or the gain in output from the deviation of the SOI becomes a relatively smaller component of the overall power output of the turbine. The default SOI (steady state) settings are chosen to balance the tradeoffs between all the outputs that are affected by SOI. The alteration to the SOI causes a deviation from the default SOI to get a gain in volumetric efficiency (further towards some desired output, such as absorbing an accessory load or reduced turbo lag). The alteration further likely causes some lessening of another output. Accordingly, when the deviation in SOI is no longer needed or (or is deemed to be not a preferred "trade off," the deviation in SOI is removed (or lessened/phased out) to send the SOI back to its default such that other ways of implementing the change that the change in SOI was providing (such as a change in throttle or turbine power) is assumed by other devices/processes. In this way, the alteration to SOI is used to induce a quick and transient response and then once traditional ways of providing/inducing the response can come into play, the alteration to SOI is removed so as to return to the desired "equilibrium" or set of output tradeoffs.

Another such output achievable by a "quick" transient change in volumetric efficiency is torque output (for fixed air-fuel ratio such as stoich engines). Changes in SOI can be implemented to gain a relatively quick response in torque output. Embodiments are envisioned for each of the "quick response" implementations where computer 42 includes quick change anticipator 208 that monitors operational parameters and attempts to predict situations where such quick responses may be called for. Computer 42 then adjusts SOI and other parameters to ensure that SOI is adjustable to achieve the potentially desired quick response. Stated differently, with respect to SOI, using torque output as an example, there is a point at which further adjustment of the SOI stops having an effect or such effect is diminished to the point of either being too small to be meaningful, or is associated with other negative outputs such that further change to the SOI is not desired/fruitful (such point being a "rail" with respect to the output property). Accordingly, when a desired torque quick response appears to have a high potential (potential above a set threshold), computer 42 adjusts SOI (anticipatory adjustment) to ensure that when a quick torque response is called for that there is enough "headroom" between the current SOI settings and the torque rail to be able to provide the called for quick torque response. It should be appreciated that the "anticipatory adjustment" often moves SOI in a way that lowers the SOI contribution to the torque (or whatever output is being considered). Accordingly, the anticipatory adjustment is coupled with changes to other operations that counteract the loss of torque from the anticipatory adjustment of SOI.

Again, the change in torque provided by the change in SOI and volumetric efficiency is able to be implemented faster than changes implemented by other means, such as the intake valve 25. However, once the intake valve 25 is able to "take over" and supply the requested additional torque, via intake valve controller 210, the torque contribution of SOI can be removed such that the SOI returns to the default protocol 200.

Figure 4:
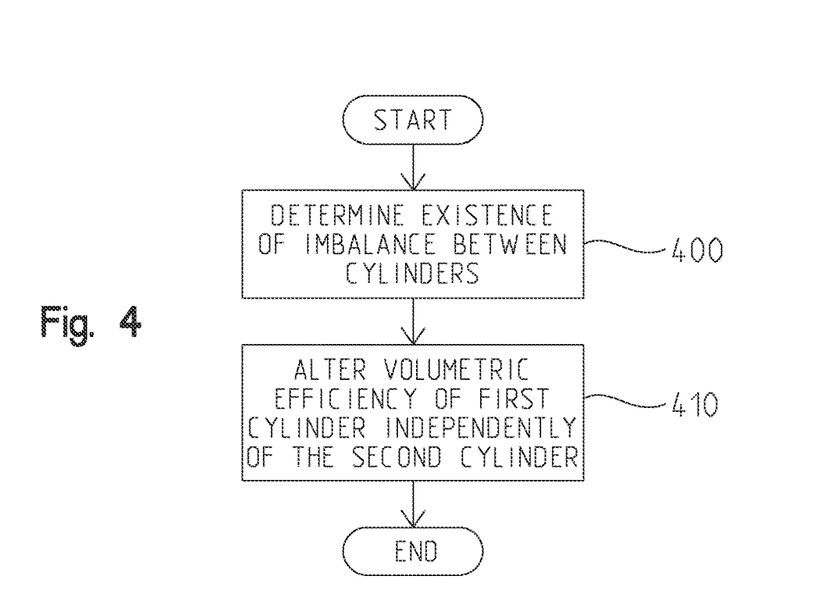
FIG. 4 is a block diagram of one illustrative embodiment of operation of the engine of FIGS. 1 and 2 that provides for cylinder-by-cylinder customization of the charge flow.

Referring now to FIG. 4, a second set of exemplary uses is described. The second set of exemplary uses share the common feature that they allow for cylinder-by-cylinder adjustment of volumetric efficiency (and thus of outputs that are a function of volumetric efficiency). As previously noted, SOI is controlled electronically by computer 42. The SOI for each cylinder is able to be controlled independently of other cylinders. Charge flow is often a function of valve openings which is further a function of rocker arms and camshafts that are of fixed geometries that are not readily customizable during operation or after such parts have been formed and installed in an engine. Certain cylinders may see differences in charge flow relative to other cylinders just due to the geometry of where they are located (at one end of a manifold vs. another end, or vs. being in the middle). Furthermore, as an engine ages, certain cylinders may experience differences in charge flow due to contaminants. Still further, the introduction of EGR gasses may cause certain cylinders to receive a charge having a different composition than other cylinders. Regardless of the source, conditions exist within the engine where there are imbalances between cylinders. Such imbalances are detected within computer 42 by an imbalance detector 212, FIG. 2; block 400, FIG. 4.

In a first example, the imbalance is between an EGR fraction seen by a first cylinder (the fraction of the charge that is comprised of exhaust gas) and an EGR fraction seen by a second cylinder. Imbalances in EGR fraction have the ability to provide imbalances in the oxygen available for combustion. The amount of exhaust gas that is supplied to an intake manifold is illustratively static and a product of the EGR valve 36. An increase in volumetric efficiency for a cylinder causes an increased amount of charge to be consumed thereby. With the amount of exhaust gas held static, an increase in charge consumption (such as via increased volumetric efficiency) causes an increased amount of fresh air to be pulled in and consumed by that cylinder. Accordingly, an increase in volumetric efficiency of a cylinder causes a drop in EGR fraction for that cylinder. Furthermore, the ability to have SOI adjust the volumetric efficiency and adjust the EGR fraction seen by a cylinder is further aided by the fact that each cylinder that shares a common intake is on an intake stroke at a different (but potentially overlapping) time. Accordingly, the ability to adjust EGR fraction at one point in time does not necessarily dictate EGR fraction at a different point in time (such as when a second cylinder is on an intake stroke). Accordingly, EGR fraction of charge is able to be adjusted cylinder-by-cylinder, even for cylinders that share a common intake manifold and/or intake source. Thus, in response to the detected imbalance between the cylinders, volumetric efficiency of one cylinder is altered independently of other cylinders, block 410, to reduce the imbalance.

In yet a further example of this cylinder-by-cylinder adjustment of EGR fraction, this adjustment can be applied to a system employing dedicated EGR cylinders. Dedicated EGR cylinders are those whose exhaust is routed exclusively to the EGR conduit 38 and thus (along with any other dedicated EGR cylinders) provide the totality or part of exhaust gas that is recirculated. In such an example, the balance of the cylinders (those that don't send their exhaust to EGR conduit 38) route their exhaust gas to turbine 26. Extrapolating this dedicated setup to the previously described situation where a rapid change in volumetric efficiency is desired (so as to reduce turbo lag or otherwise), it should be appreciated that only the cylinders that are providing exhaust to turbine 26 would be instructed to increase their volumetric efficiency in that increased charge throughput by the cylinders having their exhaust dedicated to the EGR conduit 38 would not generate increased flow for turbine 26.

Imbalances in EGR fraction also have the ability to provide imbalances in the raw fuel available for combustion. Some cylinders, such as but not limited to dedicated EGR cylinders, are purposefully run rich so that there is left over raw fuel in the exhaust thereof. As such exhaust is recirculated, raw fuel is then provided via the EGR portion of the charge. Imbalances in the EGR fraction seen by cylinders thus potentially provide an imbalance in the raw fuel provided to cylinders.

Yet another potential source of imbalance comes from providing fuel at a secondary source (direct injection into the cylinder being primary). When the secondary source is upstream of the intake valves and distributed by the manifold, the fuel provided thereby is subject to the uneven distribution by the manifold (or other part) geometry. It should be appreciated that this secondary source may be providing the same or a different fuel (e.g. natural gas and ethanol).

In a second example, the cylinder imbalance is between the torque output of a first cylinder and torque output of a second cylinder. As previously noted, adjustment of fueling of a cylinder that is torque imbalanced risks a deviation from stoich without a commensurate adjustment in the charge. With the ability to customize charge flow cylinder-by-cylinder (via adjustment of the SOI), both fueling and charge flow can be adjusted for an individual cylinder to adjust torque output while maintaining stoich.

For any value that is described herein as being measured off of engine 12, it should be appreciated that such value may be estimated or calculated instead of directly measured by various ways known in the art.

The above detailed description and the examples described therein have been presented for the purposes of illustration and description only and not for limitation. For example, the operations described may be done in any suitable manner. The method steps may be done in any suitable order still providing the described operation and results. It is therefore contemplated that the present embodiments cover any and all modifications, variations or equivalents that fall within the spirit and scope of the basic underlying principles disclosed above and claimed herein.

What is claimed is:

1. A method of inducing an operational response change in an operating direct-injection internal combustion engine comprising:

operating a direct-injection engine according to a default start of injection (SOI) protocol, the engine including a cylinder into which liquid fuel injection is directly performed;

determining that a change of a first parameter of engine operation is desired; and inducing an operational response in the engine, responsive to the determination of the desired change, by altering the default SOI protocol via a first SOI alteration that alters a volumetric efficiency of the cylinder to obtain a gain in the volumetric efficiency of the cylinder and changes the first parameter.

2. The method of claim 1, wherein altering the default SOI protocol is performed as a transient alteration.

3. The method of claim 2, wherein the desired change in first parameter is also achievable via alteration of a second engine parameter, wherein the first SOI alteration is introduced to initiate the desired change and the second engine parameter is varied to maintain the desired change when the first SOI alteration is removed.

4. The method of claim 2, wherein the second engine parameter is an intake air throttle setting.

5. The method of claim 1, wherein the first parameter is a torque produced by the engine.

6. The method of claim 5, further including altering an injection command such that an injectate is provided to the cylinder, the alteration to the injection command being responsive to the change in the volumetric efficiency due to the first SOI alteration.

7. The method of claim 6, wherein the injectate is a fuel and the injection command is a fueling command, the fueling command being altered to maintain a stoichiometric relationship with a charge having a changed volumetric efficiency due to the first SOI alteration.

8. The method of claim 1, wherein the first parameter is gas flow to a turbine of a turbocharger.

9. The method of claim 1, wherein the first parameter is turbocharger power.

10. An injection control system of an internal combustion engine including an injection valve operable to inject fuel directly into a first cylinder and perform one or more injections on an intake or compression stroke, the system comprising:
an engine controller operable to determine that a change of a first parameter of engine operation is desired; the controller further operable to generate an operational response in the engine, responsive to the determination of the desired change, by altering a default start of injection (SOI) protocol via a first SOI alteration that alters a volumetric efficiency of the first cylinder to obtain a gain in the volumetric efficiency of the first cylinder and changes the first parameter.

11. The control system of claim 10, wherein the first SOI alteration is performed as a transient alteration.

12. The control system of claim 10, further including a turbocharger fluidly coupled to the internal combustion engine, wherein the first parameter of engine operation is a turbocharger speed.

13. The control system of claim 10, wherein the engine further includes a second cylinder supplied by a common intake manifold with the first cylinder, the first cylinder experiencing a first exhaust gas recirculation (EGR) fraction and the second cylinder experiencing a second EGR fraction different than the first EGR fraction, wherein the first parameter of the engine operation is the EGR fraction experienced by the first cylinder.

14. The control system of claim 10, wherein the engine further includes a second cylinder supplied by a common intake manifold with the first cylinder, the first cylinder providing a first torque output and the second cylinder providing a second torque output different than the first torque output, wherein the first parameter of the engine operation is the first torque output provided by the first cylinder.

* * * * *